United States Patent Office 3,664,688
Patented May 23, 1972

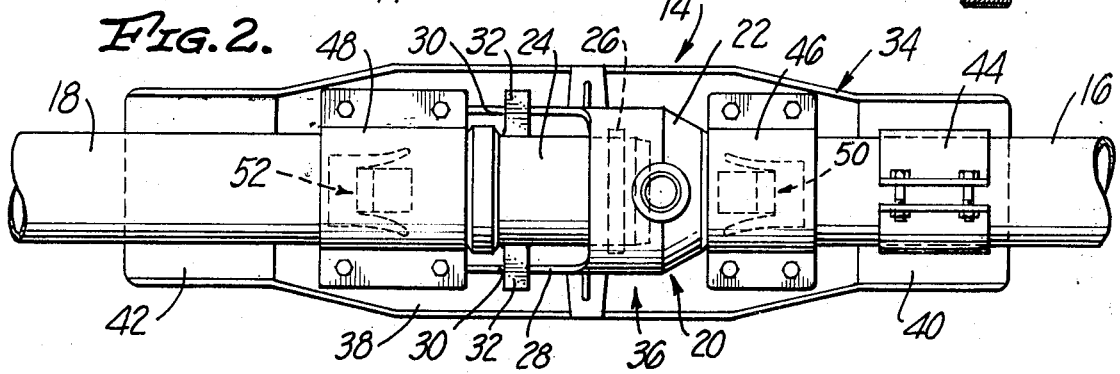
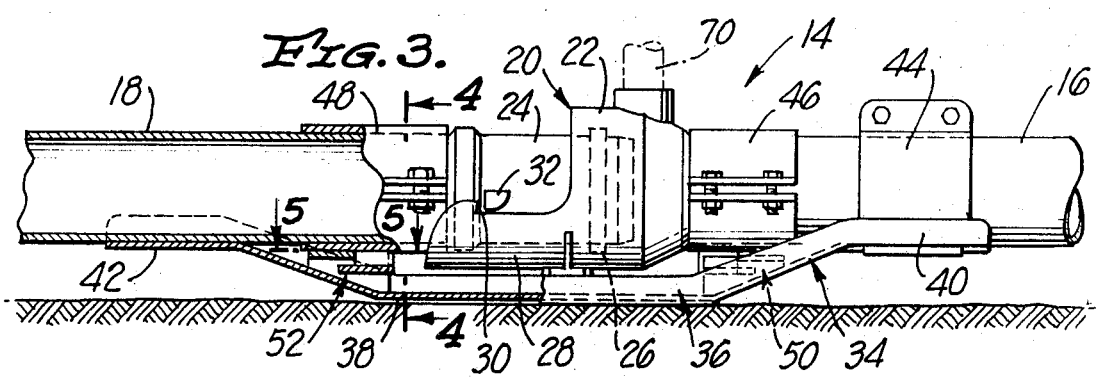
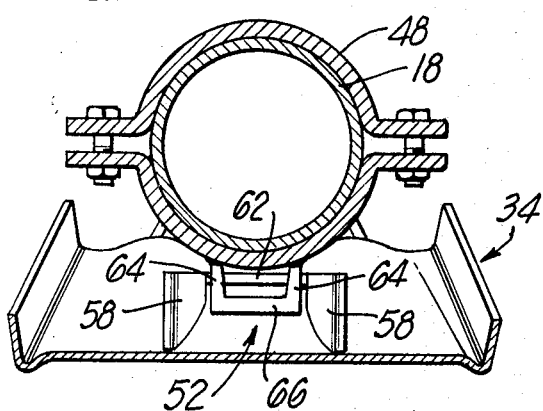
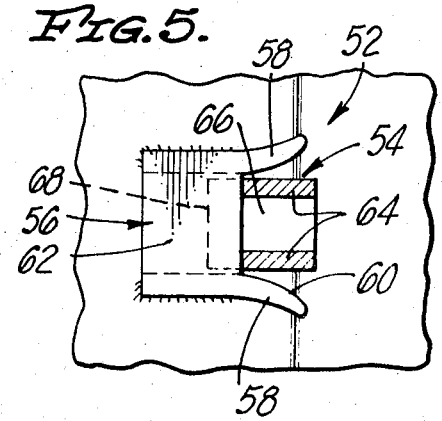
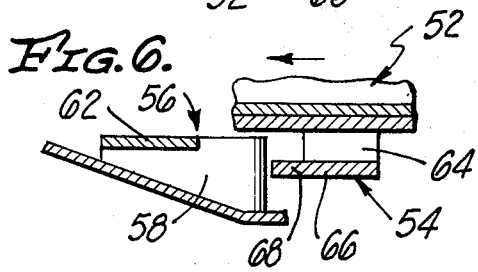

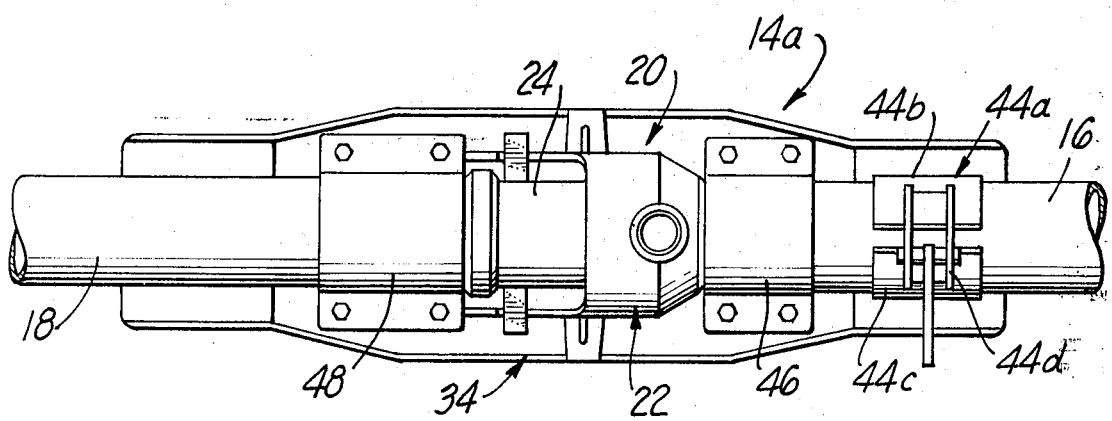
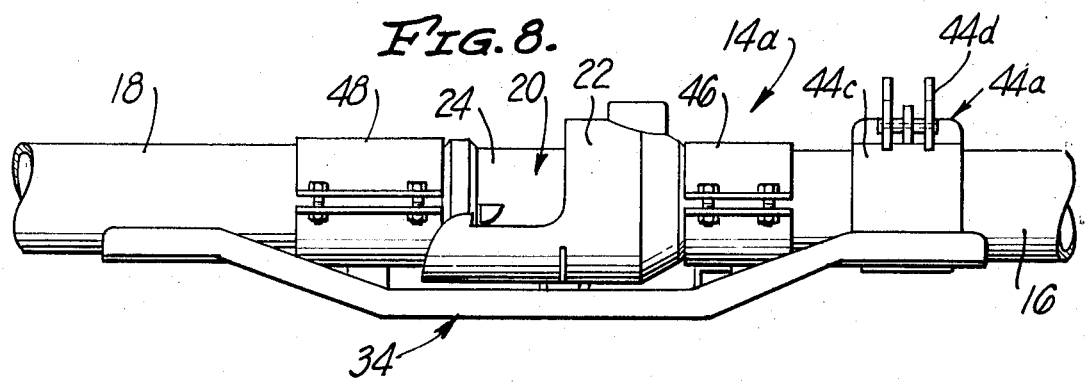

3,664,688
IRRIGATION TOWLINE ASSEMBLY
Wells D. De Loach, 3353 Rio Bonito,
Covina, Calif. 91722
Filed July 6, 1970, Ser. No. 52,577
Int. Cl. F16l 37/00
U.S. Cl. 285—6                                10 Claims

ABSTRACT OF THE DISCLOSURE

An irrigation towline assembly including a pair of water pipes releasably joined end to end by a sealed coupling having slidably interfitting parts with coacting thrust shoulders which permit limited relative axial movement of the parts, a coupler skid having a clamp at one end firmly clamping one pipe to the skid, and coacting lugs on the other pipe and skid which engage to firmly anchor the pipe to the skid as a result of limited axial separation movement of the latter pipe relative to the clamped pipe when a towing force is applied to the towline. The lugs are disengaged to permit uncoupling of the pipes by relative axial movement of the pipes toward one another.

BACKGROUND OF THE INVENTION

Field of the invention

This invention relates generally to field irrigation equipment and more particularly to an improved irrigation towline assembly embodying a novel coupler skid.

Prior art

One method of irrigating a large agricultural field involves the use of an irrigation towline. Such an irrigation towline has a number of water pipes joined end to end by intervening releasable couplings, and a coupler skid bridging coupling. Each skid body has a skid positioned below its respective coupling and is clamped at its ends to the adjacent pipes at opposite sides of the coupling. Between its ends, each skid has a central ground engaging portion situated directly under the coupling. Sprinkler heads are mounted at intervals along the towline, often directly on one part of each pipe coupling.

The coupler skids permit the irrigation towline to be pulled along the ground without damage to or separation of the pipe couplings. This requires the parts of each coupling to be firmly secured to one another and to the skid. The existing coupler skids are deficient in that they employ two clamps, one for each pipe joined by the adjacent pipe coupling. As a consequence, when coupling and uncoupling the pipes, one clamp must be released and set by hand. This method of joining the pipes to the coupler skids makes the task of assembling and disassembling an irrigation towline an extremely tedious and time consuming operation. In this regard, it is significant to note that an irrigation towline may have on the order of 44 coupler skids, each of which must be set and released by hand when assembling and disassembling the towline.

SUMMARY OF THE INVENTION

The present improved irrigation towline assembly includes a pair of towline water pipes releasably joined end to end by an intervening sealed coupling having slidably interfitting parts with coacting thrust shoulders which permit limited relative axial movement of the parts, and a coupler skid bridging the coupling. This skid includes a body having a central ground engaging portion below the coupling and end portions below the pipes, respectively. One skid end portion mounts a clamp for firmly clamping the adjacent pipe, hereafter referred to as the fixed pipe, to the skid. The opposite end of the skid and the other pipe, hereafter referred to as the movable pipe, have coacting lugs which engage to firmly anchor the movable pipe to the skid upon axial separation movement of the latter pipe relative to the fixed pipe to the limit permitted by the coupling thrust shoulders. The lugs are disengaged to permit uncoupling of the pipes by relative axial movement of the pipes toward one another.

In field use, each pair of adjacent pipes of the towline are quickly and easily assembled by merely inserting the coupling part on the movable pipe into the coupling part on the fixed pipe and then resting the movable pipe on the adjacent end of the coupler skid which is saddle-shaped to nest the pipe. When a towing force is later exerted on the towline, the movable pipe of each coupling undergoes limited relative axial separation movement with respect to the fixed pipe and skid to engage the coacting lugs on the skid and movable pipe and thereby firmly anchor the movable pipe to the skid.

BRIEF DESCRIPTION OF THE DRAWINGS

FIG. 1 illustrates a present irrigation towline being towed across a field by a tractor;

FIG. 2 is an enlarged plan view of a present towline assembly;

FIG. 3 is a side elevation of the towline assembly partly in section;

FIG. 4 is an enlarged section taken on line 4—4 in FIG. 3;

FIG. 5 is an enlarged section taken on line 5—5 in FIG. 3;

FIG. 6 is a section through the structure of FIG. 5 with the illustrated parts disengaged;

FIG. 7 is a plan view of a modified tow line assembly according to the invention; and FIG. 8 is a side elevation of the modified towline assembly.

DESCRIPTION OF THE PREFERRED
EMBODIMENTS

FIG. 1 illustrates an irrigation towline 10 being pulled across an agricultural field by a tractor 12. The towline is composed of a number of towline assemblies 14 according to the invention.

Turning to FIGS. 2-6, each towline assembly 14 includes a pair of towline water pipes 16 and 18 releasably joined end to end by an intervening sealed coupling 20. For reasons mentioned earlier and hereafter explained in more detail, the right-hand or forward pipe 16 is hereafter referred to as the fixed pipe. The left-hand or rear pipe 18 is referred to as the movable pipe. Coupling 20 has a female part 22 joined to the fixed pipe 16 and a male part 24 joined to the movable pipe 18. These coupling parts slidably interengage and are sealed to one another by a seal ring 26 in a manner such that the parts can move axially relative to one another a limited distance without leaking. Extending rearwardly from the female coupling part 22, at opposite sides of the male part 24, are arms 28 terminating in upstanding forwardly facing thrust shoulders 30. Thrust shoulders 32 project laterally from opposite sides of the male part for engagement with the thrust shoulders 30 to limit relative axial separation movement of the coupling parts 22, 24 while permitting uncoupling and recoupling of the parts.

In addition to the pipes 16, 18 and coupling 20, the towline assembly 14 has a coupler skid 34 including a skid body 36. Skid body has a central ground engaging portion 38 below the coupling 20, a front end portion 40 below the fixed pipe 16, and a rear end portion 42 below the movable pipe 18. Mounted on the front skid end portion 40 is a clamp 44 for firmly clamping the fixed pipe 16 to the skid body 36. The rear skid end portion 42 provides a saddle for seating or nesting the movable pipe 18.

Mounted on the pipes 16, 18 adjacent the coupling 20 are clamp sleeves 46, 48. Fixed to these sleeves and to the skid body 36 are sets 50, 52 of coacting lugs. These lug sets are identical except that they are reversed so that a description of one, set 52, will suffice for both. As shown best in FIGS. 5 and 6, lug set 52 has a male lug 54 depending from the underside of the movable pipe clamp sleeve 48 and a female lug 56 rising from skid body 36. This female lug has a pair of side walls 58 which turn outwardly at their front ends to define a flared mouth 60 and a top wall 62 bridging the side walls at the rear end of the mouth. The male lug 54 has a pair of depending side walls 64 bridged by a bottom wall 66 which extends rearwardly of the side walls to form a lip 68.

As shown best in FIG. 3, forward movement of the fixed pipe 16 relative to the skid body 36 results in entrance of the male lug 54 of the front lug set 50 into the mouth 60 of the female lug 56 to a position where the male lug side walls 64 engage the female lug top wall 62 to limit forward movement of the pipe relative to the skid and the male lug lip 68 engages under the female lug top wall 62 to anchor the fixed pipe to the skid. Rearward movement of the movable pipe 18 relative to the skid body 36 results in similar interengagement of the lugs 54, 56 of the rear lug set 52 to limit rearward movement of the pipe relative to and firmly anchor the pipe to the skid body.

The towline 10 mounts a number of irrigation sprinkler heads (not shown) mounted at intervals along the towline. In this case, the sprinkler heads are attached by rotary stems 70 to the female coupling parts 22.

In field use, the towline 10 is assembled by inserting the male coupling part 24 of each coupling 20 into its respective female part 22. A towing force is then exerted on the towline by the tractor 12. This force effects relative axial separation movement of each male coupling part and its female part to engage the respective lugs 54, 56 and thereby firmly anchor the parts to the skid 36. The coupling thrust shoulders 30, 32 also engage to limit axial separation of the coupling parts.

The modified towline assembly 14a of FIGS. 7 and 8 is identical to that of FIGS. 1–6 except that the fixed pipe clamp 44 is replaced by a lever actuated toggle clamp 44a including hinged plates 44b, 44c joined by a toggle clamp 44d. This clamp may be operated to clamp the plates about the fixed pipe 16 and release the plates for removal of the pipe.

What is claimed as new in support of Letters Patent is:

1. An irrigation towline comprising:
   a pair of first and second water pipes disposed end to end,
   a releasable sealed coupling joining the adjacent ends of said pipes including slidably, sealingly, interfitting coupling parts connected to said pipe ends, whereby said pipes are capable of relative axial movement,
   a towline coupler skid having a central ground-engaging portion below said coupling and end portions below said pipe ends, respectively,
   means securing said first pipe to said skid, whereby when a towing force is applied to said towline, said second pipe undergoes axial separation movement relative to said first pipe,
   coacting lugs on said skid and said second pipe which engage upon given axial separation movement of said latter pipe to anchor said latter pipe to said skid and disengage upon axial movement of said latter pipe toward said first pipe to permit uncoupling of the pipes; and
   means for restraining said coupling parts against axial separation when said lugs are engaged.

2. A towline according to claim 1 wherein: said restraining means includes coacting shoulder means on said coupling parts, respectively, for limiting relative axial separation movement of said parts while permitting deliberate uncoupling of said parts.

3. A towline according to claim 1 wherein: one of said lugs has a flared mouth for receiving the other lug.

4. A towline according to claim 1 wherein: said first pipe securing means is a releasable clamp.

5. A towline according to claim 1 wherein: the lug carried by said second pipe includes a clamp securing the latter lug to said second pipe.

6. A towline according to claim 1 wherein:
   said restraining means includes coacting shoulder means on said coupling parts for limiting relative axial separation movement of said parts while deliberately permitting uncoupling of said parts,
   said first pipe securing means is a releasable clamp,
   one of said lugs has a flared mouth receiving the other lug, and
   the lug carried by said second pipe includes a clamp securing the latter lug to said second pipe.

7. A coupling skid assembly for an irrigation towline having a pair of towline water pipes arranged end to end comprising:
   a sealed coupling having separable, sealingly interfitting coupling parts,
   a coupler skid below said coupling having end portions below said coupling parts, respectively, and a central ground-engaging portion,
   means on one skid end portion for securing the adjacent coupling part to said skid, and
   a projecting lug rising from the bottom of said skid adjacent said other skid end portion and a mating lug depending from the underside of the other coupling part engageable with said skid lug for anchoring the latter part to said skid upon axial separation movement of the latter part relative to said adjacent part.

8. A towline skid assembly according to claim 7 wherein: said securing means is a releasable clamp.

9. An irrigation towline comprising:
   a pair of first and second water pipes disposed end to end,
   a releasable sealed coupling joining the adjacent ends of said pipes including interfitting axially separable coupling parts sealed to each other and connected to said pipe ends whereby said pipes are capable of relative axial movement,
   a towline coupler skid having a central ground-engaging portion below said coupling and end portions below said pipe ends, respectively,
   coacting lugs on said pipe ends and skid end portions which interengage to anchor said skid to said pipes upon relative axial separation movement of said pipes and disengage to release said skid for removal from said pipes upon relative telescoping movement of said pipes; and
   means releasably securing said coupling parts against axial separation when said lugs are engaged.

10. A coupling skid assembly for an irrigation towline having a pair of towline water pipes arranged end of end comprising:
    a sealed coupling having separable, sealingly interfitting coupling parts connected to said pipe ends,
    a coupler skid below said coupling having end portions below said coupling parts, respectively, and a central ground-engaging portion,
    means on one skid end portion for securing the adjacent coupling part to said skid,
    coacting lugs on said coupling parts and skid end portions which interengage to anchor said skid to said coupling upon relative axial separation movement of said coupling parts and disengage to release said skid for removal from said coupling upon relative telescoping movement of said coupling parts; and means releasably securing said coupling parts against axial separation when said lugs are engaged.

References Cited

UNITED STATES PATENTS

| | | | |
|---|---|---|---|
| 627,987 | 7/1899 | Dick | 285—419 X |
| 2,469,538 | 5/1949 | Young | 285—5 |
| 2,834,634 | 5/1958 | Johnson | 285—5 X |
| 2,874,979 | 2/1959 | Shohon | 285—6 |
| 3,386,755 | 6/1968 | Miller | 285—6 |
| 3,485,515 | 12/1969 | Frishot | 285—5 |

FOREIGN PATENTS

| | | | |
|---|---|---|---|
| 957,176 | 1/1957 | Germany | 285—5 |

DAVE W. AROLA, Primary Examiner

U.S. Cl. X.R.

285—24